(12) United States Patent
Tsutsumi

(10) Patent No.: US 8,514,546 B2
(45) Date of Patent: Aug. 20, 2013

(54) ELECTRONIC COMPONENT

(75) Inventor: Hironori Tsutsumi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 35 days.

(21) Appl. No.: 13/224,465

(22) Filed: Sep. 2, 2011

(65) Prior Publication Data

US 2012/0057268 A1    Mar. 8, 2012

(30) Foreign Application Priority Data

Sep. 6, 2010   (JP) ................. 2010-199203
Jul. 22, 2011   (JP) ................. 2011-160948

(51) Int. Cl.
   *H01G 4/06*   (2006.01)
   *H01G 4/30*   (2006.01)
   *H01G 4/228*  (2006.01)
   *H01G 4/005*  (2006.01)

(52) U.S. Cl.
   USPC ............... 361/301.4; 361/321.2; 361/321.3; 361/303; 361/306.1

(58) Field of Classification Search
   USPC ............. 361/303, 301.4, 321.3, 321.2, 306.1
   See application file for complete search history.

(56) References Cited

U.S. PATENT DOCUMENTS

| | | |
|---|---|---|
| 2008/0074826 A1 | 3/2008 | Lee et al. |
| 2009/0015986 A1* | 1/2009 | Togashi .................... 361/321.4 |
| 2010/0128411 A1 | 5/2010 | Onishi et al. |

FOREIGN PATENT DOCUMENTS

| | | |
|---|---|---|
| JP | 02-016709 A | 1/1990 |
| JP | 2004-172466 A | 6/2004 |
| JP | 2008-078664 A | 4/2008 |
| JP | 2009-170873 A | 7/2009 |
| JP | 2010-129737 A | 6/2010 |
| JP | 2010-147430 A | 7/2010 |

* cited by examiner

*Primary Examiner* — Eric Thomas
*Assistant Examiner* — Arun Ramaswamy
(74) *Attorney, Agent, or Firm* — Keating & Bennett, LLP

(57) ABSTRACT

In an electronic component, a first external electrode includes a first side surface electrode provided on a first side surface and a substantially rectangular first principal surface electrode that is connected to the first side surface electrode and provided on a principal surface so as to be in contact with a first corner of the principal surface. A second external electrode includes a second side surface electrode that is connected to a capacitor conductor and provided on a second side surface and a substantially rectangular second principal surface electrode that is connected to the second side surface electrode and provided on the principal surface so as to be in contact with a second corner, which is located opposite to the first corner, the second principal surface electrode facing the first principal surface electrode in an x-axis direction, in which long sides of the principal surface extend.

5 Claims, 13 Drawing Sheets

ELECTRONIC COMPONENT

BACKGROUND OF THE INVENTION

1. Field of the Invention

The present invention relates to an electronic component and, more particularly, to an electronic component including a capacitor incorporated therein.

2. Description of the Related Art

An example of a known electronic component is a multilayer capacitor disclosed in Japanese Unexamined Patent Application Publication No. 2009-170873. The multilayer capacitor includes a capacitor body, a first external terminal electrode, a second external terminal electrode, and a capacitor. The capacitor body has a layered structure including a plurality of dielectric layers stacked on one another, and has a substantially rectangular parallelepiped shape including a first principal surface and a second principal surface that extend in a surface direction of the dielectric layers and that face each other, a first side surface and a second surface that face each other, and a first end surface and a second end surface that face each other. The dimensions of the first end surface and the second end surface in the longitudinal direction are greater than those of the first side surface and the second side surface, respectively, in the longitudinal direction. In addition, the first external terminal electrode is connected to the capacitor and provided on the first end surface. The second external terminal electrode is connected to the capacitor and provided on the second end surface.

According to the multilayer capacitor disclosed in Japanese Unexamined Patent Application Publication No. 2009-170873, as described below, equivalent series inductance (ESL) is desirably less than a multilayer capacitor in which a first external terminal electrode and a second external terminal electrode are provided on a first side surface and a second side surface, respectively. The dimensions of the first end surface and the second end surface in the longitudinal direction are greater than those of the first side surface and the second side surface, respectively, in the longitudinal direction. Therefore, in the multilayer capacitor in which the first external terminal electrode and the second external terminal electrode are provided on the first side surface and the second side surface, respectively, a signal path runs through a space between the first side surface and the second side surface, whose length is relatively large and whose width is relatively small.

On the other hand, in the multilayer capacitor disclosed in Japanese Unexamined Patent Application Publication No. 2009-170873, the first external terminal electrode and the second external terminal electrode are provided on the first end surface and the second end surface, respectively. Therefore, a signal path runs through a space between the first end surface and the second end surface, whose length is relatively small and whose width is relatively large. Therefore, the value of inductance generated in the signal path of the multilayer capacitor disclosed in Japanese Unexamined Patent Application Publication No. 2009-170873 is less than the value of inductance generated in the signal path of the multilayer capacitor in which the first external terminal electrode and the second external terminal electrode are provided on the first side surface and the second side surface, respectively. That is, according to the multilayer capacitor disclosed in Japanese Unexamined Patent Application Publication No. 2009-170873, the ESL is desirably less than the multilayer capacitor in which the first external terminal electrode and the second external terminal electrode are provided on the first side surface and the second side surface, respectively.

However, the multilayer capacitor disclosed in Japanese Unexamined Patent Application Publication No. 2009-170873 has a problem in that it is difficult to install the multilayer capacitor in a circuit board. FIG. 13A is a sectional view of a multilayer capacitor 500 disclosed in Japanese Unexamined Patent Application Publication No. 2009-170873 and a circuit board 600 when the multilayer capacitor 500 has been installed in the circuit board 600. FIG. 13B is a plan view of the multilayer capacitor 500 disclosed in Japanese Unexamined Patent Application Publication No. 2009-170873 and the circuit board 600 when the multilayer capacitor 500 has been installed in the circuit board 600.

As illustrated in FIG. 13A, the multilayer capacitor 500 is installed in a recess 602 in the circuit board 600. A seal 604 is then formed on the multilayer capacitor 500. Wires 608a and 608b are provided on a principal surface of the circuit board 600. The wires 608a and 608b are connected to external terminal electrodes 504a and 504b, respectively, by via-hole conductors 606a and 606b, respectively. The multilayer capacitor 500 is installed in the circuit board 600 so as to have the above-described configuration.

The via-hole conductors 606a and 606b are formed by the following procedure. After the multilayer capacitor 500 is installed in the recess 602 and the seal 604 is formed, laser beams having a diameter of about 50 µm to about 100 µm are radiated onto certain portions in order to form via holes. After that, by filling the via holes with a conductive paste or by plating the via holes, the via-hole conductors 606a and 606b are formed.

However, as illustrated in FIG. 13B, the external terminal electrodes 504a and 504b are provided on the first end surface and the second end surface, respectively. Dimensions L2 of the first side surface and the second side surface in the longitudinal direction are less than dimensions L1 of the first end surface and the second end surface in the longitudinal direction. For this reason, as illustrated in FIG. 13B, widths W of portions in which the external terminal electrodes 504a and 504b extend on principal surfaces are small. Therefore, it is difficult to form the via-hole conductors 606a and 606b so as to connect to the external terminal electrodes 504a and 504b, respectively. In particular, since the seal 604 is provided, it is difficult to radiate laser beams onto the correct locations, thereby making it difficult to form the via-hole conductors 606a and 606b so as to connect to the external terminal electrodes 504a and 504b, respectively.

SUMMARY OF THE INVENTION

To overcome the problems described above, preferred embodiments of the present invention provide an electronic component having a significantly reduced ESL and which can be easily installed in a circuit board.

An electronic component according to a preferred embodiment of the present invention preferably includes a multilayer body that has a substantially rectangular parallelepiped shape including a first principal surface and a second principal surface located at both ends, respectively, in a direction in which layers are stacked and a first side surface and a second side surface located at both ends, respectively, in a short side direction, which is a direction in which short sides of the first principal surface extend, a first capacitor conductor and a second capacitor conductor that define a portion of a capacitor in the multilayer body, a first external electrode including a first side surface electrode that is connected to the first capacitor conductor and that is provided on the first side surface and a first principal surface electrode that has a substantially rectangular shape, that is connected to the first side surface electrode, and that is provided on the first principal surface so as to be in contact with a first corner of the first principal surface, and a second external electrode including a second side surface electrode that is connected to the second capacitor conductor and that is provided on the second side surface and a second principal surface electrode that has a substantially rectangular shape, that is connected to the second side surface electrode, and that is provided on the first principal surface so as to be in contact with a second corner of the first principal surface, which is a corner opposite to the first corner, the second principal surface electrode facing the first principal surface electrode in a longitudinal direction, which is a direction in which long sides of the first principal surface extend.

According to this preferred embodiment of the present invention, ESL is low and installation of an electronic component in a circuit board is facilitated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An electronic component according to preferred embodiments of the present invention will be described hereinafter with reference to the drawings.

First Preferred Embodiment

Figure 1:
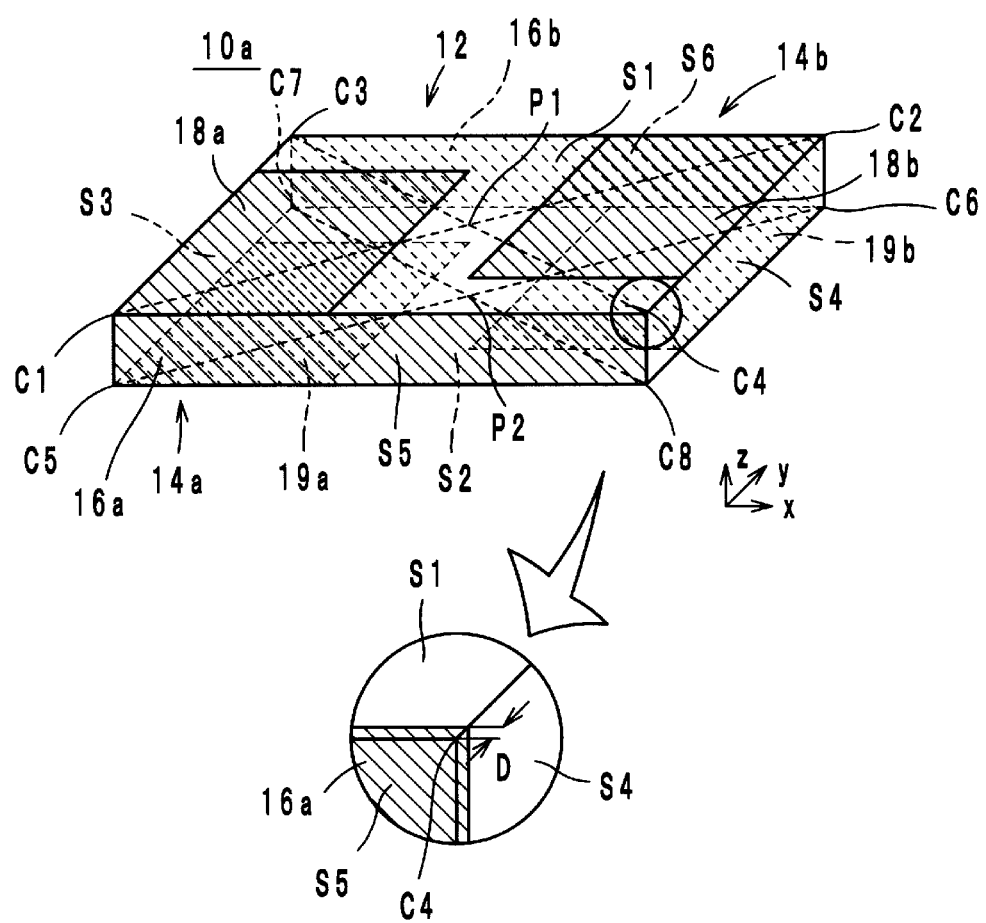
FIG. 1 is an external perspective view and a partially enlarged view of an electronic component according to a first preferred embodiment of the present invention.
Figure 2:
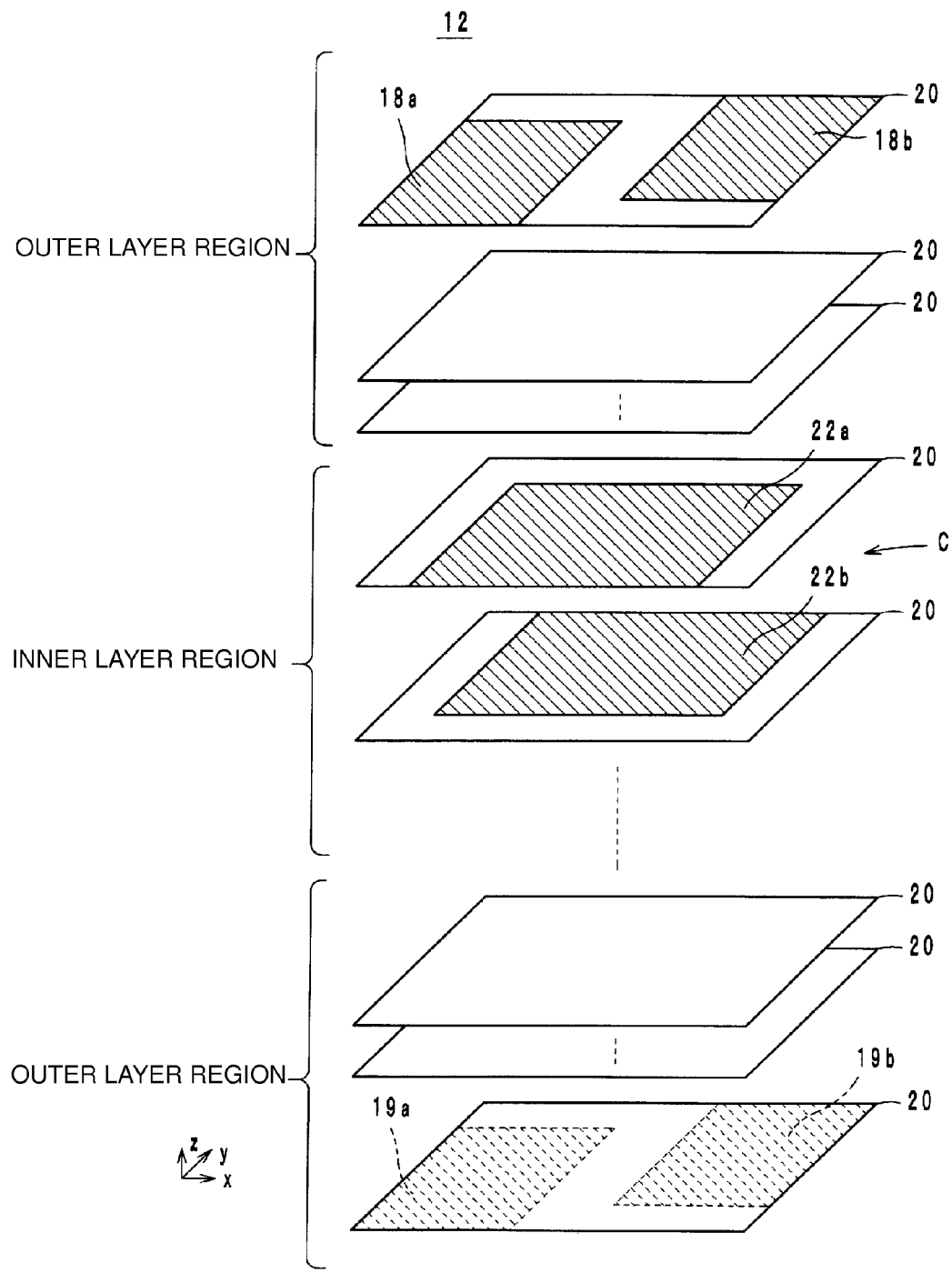
FIG. 2 is an exploded perspective view of a multilayer body of the electronic component illustrated in FIG. 1.

First, the configuration of an electronic component according to a first preferred embodiment of the present invention will be described with reference to the drawings. FIG. 1 is an external perspective view and a partially enlarged view of an electronic component 10a according to the first preferred embodiment. FIG. 2 is an exploded perspective view of a multilayer body 12 of the electronic component 10a illustrated in FIG. 1. In the following description, a direction in which layers are stacked in the multilayer body 12 is defined as a z-axis direction. A long side direction, which is a direction in which long sides of principal surfaces of the multilayer body 12 extend when the multilayer body 12 is viewed in plan from the z-axis direction, is defined as an x-axis direction. A short side direction, which is a direction in which short sides of the principal surfaces of the multilayer body 12 extend when the multilayer body 12 is viewed in plan from the z-axis direction, is defined as a y-axis direction.

The electronic component 10a is a chip capacitor and, as illustrated in FIGS. 1 and 2, includes a multilayer body 12, external electrodes 14 (14a and 14b), and a capacitor C (not illustrated in FIG. 1). The chip capacitor preferably has a substantially rectangular parallelepiped shape having external dimensions of about 600 μm (x-axis direction)×about 300 μm (y-axis direction)×about 150 μm (z-axis direction), for example. It is to be noted that the length of the chip capacitor in the z-axis direction is preferably about 50 μm or more and about 330 μm or less, for example. Furthermore, in order to reduce the height of the chip capacitor, the length of the chip capacitor in the z-axis direction is preferably between about 50 μm and about 150 μm, for example.

The multilayer body 12 preferably has a substantially rectangular parallelepiped shape. In the following description, a surface of the multilayer body 12 on the positive side in the z-axis direction is denoted as a principal surface S1, and a surface of the multilayer body 12 on the negative side in the z-axis direction is denoted as a principal surface S2. That is, the principal surfaces S1 and S2 are located at both ends in the z-axis direction, respectively. In addition, a surface of the multilayer body 12 on the negative side in the x-axis direction is denoted as an end surface S3, and a surface of the multilayer body 12 on the positive side in the x-axis direction is denoted as an end surface S4. That is, the end surfaces S3 and S4 are located at both ends in the x-axis direction, respectively. In addition, a surface of the multilayer body 12 on the negative side in the y-axis direction is denoted as a side surface S5, and a surface of the multilayer body 12 on the positive side in the y-axis direction is denoted as a side surface S6. That is, the side surfaces S5 and S6 are located at both ends in the y-axis direction, respectively.

The multilayer body 12, as illustrated in FIG. 2, includes a plurality of insulation layers 20 that are stacked on one another. In this preferred embodiment, preferably, thirty insulation layers 20, for example, are stacked. Each of the insulation layers 20 preferably has a substantially rectangular shape and is made of a dielectric ceramic. Examples of the dielectric ceramic include $BaTiO_3$, $CaTiO_3$, $SrTiO_3$, and $CaZrO_3$. Alternatively, one of these materials may be used as a principal component, and a Mn compound, a Fe compound, a Cr compound, a Co compound, or a Ni compound, for example, may preferably be used as an accessory component. In the following description, principal surfaces of the insulation layers 20 on the positive side in the z-axis direction will be referred to as top surfaces and principal surfaces of the insulation layers 20 on the negative side in the z-axis direction will be referred to as bottom surfaces.

In addition, if the distance between the end surfaces S3 and S4 is assumed to be L, the distance between the side surfaces S5 and S6 is assumed to be W, and the distance between the principal surfaces S1 and S2 is assumed to be T, it is preferable that a relationship represented by an expression $L>W>T$ is satisfied. In particular, it is preferable that $T \leq 0.25$ mm and $0.2 \cdot W \leq T \leq 1.5 \cdot W$, for example.

As described above, the principal surface S1 of the multilayer body 12 is defined by a top surface of one of the insulation layers 20 provided on the most positive side in the z-axis direction. The principal surface S2 of the multilayer body 12 is defined by a bottom surface of one of the insulation layers 20 provided on the most negative side in the z-axis direction. In addition, the end surface S3 is defined by a group of short sides of the plurality of insulation layers 20 on the negative side in the x-axis direction. The end surface S4 is defined by a group of short sides of the plurality of insulation layers 20 on the positive side in the x-axis direction. The side surface S5 is defined by a group of long sides of the plurality of insulation layers 20 on the negative side in the y-axis direction. The side surface S6 is defined by a group of long sides of the plurality of insulation layers 20 on the positive side in the y-axis direction.

In addition, in the principal surface S1 of the multilayer body 12, a corner located on the negative side in the x-axis direction and on the negative side in the y-axis direction is denoted as corner C1. In the principal surface S1 of the multilayer body 12, a corner located on the positive side in the x-axis direction and on the positive side in the y-axis direction is denoted as corner C2. In the principal surface S1 of the multilayer body 12, a corner located on the negative side in the x-axis direction and on the positive side in the y-axis direction is denoted as corner C3. In the principal surface S1 of the multilayer body 12, a corner located on the positive side in the x-axis direction and on the negative side in the y-axis direction is denoted as corner C4.

In addition, in the principal surface S2 of the multilayer body 12, a corner located on the negative side in the x-axis direction and on the negative side in the y-axis direction is denoted as corner C5. In the principal surface S2 of the multilayer body 12, a corner located on the positive side in the x-axis direction and on the positive side in the y-axis direction is denoted as corner C6. In the principal surface S2 of the multilayer body 12, a corner located on the negative side in the x-axis direction and on the positive side in the y-axis direction is denoted as corner C7. In the principal surface S2 of the multilayer body 12, a corner located on the positive side in the x-axis direction and on the negative side in the y-axis direction is denoted as corner C8.

The capacitor C is, as illustrated in FIG. 2, preferably defined by capacitor conductors 22 (22a and 22b) included in the multilayer body 12. Each of the capacitor conductors 22 is preferably made of a conductive material such as, for example, Ni, Cu, Ag, Pd, an Ag—Pd alloy, or Au.

The capacitor conductor 22a is, as illustrated in FIG. 2, preferably provided on a top surface of one of the insulation layers 20 and preferably has a substantially rectangular shape, for example. The capacitor conductor 22a extends to a long side of the one of the insulation layers 20 on the negative side in the y-axis direction. The capacitor conductor 22b is, as illustrated in FIG. 2, preferably provided on a top surface of another of the insulation layers 20 and has a substantially rectangular shape. The capacitor conductor 22b extends to a long side of another of the insulation layers 20 on the positive side in the y-axis direction. The capacitor conductors 22a and 22b face each other through the one of the insulation layers 20 and generate capacitance. Thus, the capacitor conductors 22a and 22b together define the capacitor C in the multilayer body 12.

The capacitor conductors 22a and 22b configured as described above are preferably provided on the plurality of insulation layers 20 so as to be alternately arranged in the z-axis direction. A region in which the plurality of insulation layers 20 on which the capacitor conductors 22 are provided are stacked is referred to as an inner layer region. In addition, on the positive side of the inner layer region in the z-axis direction, a plurality of insulation layers 20 on which capacitor conductors 22 are not provided are preferably stacked. Similarly, on the negative side of the inner layer region in the z-axis direction, a plurality of insulation layers 20 on which capacitor conductors 22 are not provided are preferably stacked. These two regions will be referred to as outer layer regions hereinafter.

The external electrode 14a includes, as illustrated in FIG. 1, a side surface electrode 16a and principal surface electrodes 18a and 19a. The side surface electrode 16a is configured so as to cover substantially the entire side surface S5, and is connected to the capacitor conductor 22a. The side surface electrode 16a is preferably fabricated by plating a ground electrode made of Ni with Cu, for example. In addition, in the side surface electrode 16a, the ground electrode is preferably formed by dipping, for example. Therefore, as illustrated in the enlarged view of FIG. 1, the side surface electrode 16a slightly extends onto the principal surfaces S1 and S2 and the end surfaces S3 and S4, which are adjacent to the side surface S5. The width of this extension of the side surface electrode 16a is denoted as a width D. The width D is preferably between about 5 μm and about 20 μm, for example.

The principal surface electrode 18a is preferably fabricated by plating a ground electrode made of Ni with Cu, for example. The principal surface electrode 18a is connected to the side surface electrode 16a and provided on the top surface of the one of the insulation layers 20 that is provided on the most positive side in the z-axis direction. More specifically, the principal surface electrode 18a is preferably a substantially rectangular conductive layer that is provided on the principal surface S1 so as to be in contact with the corner C1 of the principal surface S1. The principal surface electrode 18a is in contact with the side surface electrode 16a at a side thereof on the negative side in the y-axis direction. However, the side of the principal surface electrode 18a on the negative side in the y-axis direction is in contact with only a portion of a long side of the principal surface S1 on the negative side in the y-axis direction. Preferably, a gap is provided between a side of the principal surface electrode 18a on the positive side in the y-axis direction and a long side of the principal surface S1 on the positive side in the y-axis direction. Therefore, the principal surface electrode 18a is insulated from the external electrode 14b. However, the side of the principal surface electrode 18a on the positive side in the y-axis direction is preferably located on a more positive side in the y-axis direction than an intersection point P1 between the diagonals of the principal surface S1. In addition, a side of the principal surface electrode 18a on the negative side in the x-axis direction preferably matches a short side of the principal surface S1 on the negative side in the x-axis direction. In addition, a side of the principal surface electrode 18a on the positive side in the x-axis direction preferably extends in the y-axis direction on a more negative side in the x-axis direction than the intersection point P1.

The principal surface electrode 19a is fabricated by plating a ground electrode made of Ni with Cu, for example. The principal surface electrode 19a is connected to the side surface electrode 16a and provided on the bottom surface of the one of the insulation layers 20 that is provided on the most negative side in the z-axis direction. More specifically, the principal surface electrode 19a is preferably a substantially rectangular conductive layer that is provided on the principal surface S2 so as to be in contact with the corner C5 of the principal surface S2. The principal surface electrode 19a is in contact with the side surface electrode 16a at a side thereof on the negative side in the y-axis direction. However, the side of the principal surface electrode 19a on the negative side in the y-axis direction is preferably in contact with only a portion of a long side of the principal surface S2 on the negative side in the y-axis direction. Preferably, there is a gap between a side of the principal surface electrode 19a on the positive side in the y-axis direction and a long side of the principal surface S2 on the positive side in the y-axis direction. Therefore, the principal surface electrode 19a is insulated from the external electrode 14b. However, the side of the principal surface electrode 19a on the positive side in the y-axis direction is preferably located on a more positive side in the y-axis direction than an intersection point P2 between the diagonals of the principal surface S2. In addition, a side of the principal surface electrode 19a on the negative side in the x-axis direction preferably matches a short side of the principal surface S2 on the negative side in the x-axis direction. In addition, a side of the principal surface electrode 19a on the positive side in the x-axis direction preferably extends in the y-axis direction on a more negative side in the x-axis direction than the intersection point P2.

The external electrode 14b preferably includes, as illustrated in FIG. 1, a side surface electrode 16b and principal surface electrodes 18b and 19b. The side surface electrode 16b is configured so as to cover substantially the entire side surface S6, and is connected to the capacitor conductor 22b. The side surface electrode 16b is preferably fabricated by plating a ground electrode made of Ni with Cu, for example. In addition, in the side surface electrode 16b, the ground electrode is preferably formed by dipping, for example. Therefore, similar to side surface electrode 16a, the side surface electrode 16b slightly extends on the principal surfaces S1 and S2 and the end surfaces S3 and S4, which are adjacent to the side surface S6. The width of this extension of the side surface electrode 16b is denoted as a width D. The width D is preferably between about 5 μm and about 20 μm, for example.

The principal surface electrode 18b is preferably fabricated by plating a ground electrode made of Ni with Cu, for example. The principal surface electrode 18b is connected to the side surface electrode 16b and provided on the top surface of the one of the insulation layers 20 that is provided on the most positive side in the z-axis direction. More specifically, the principal surface electrode 18b is preferably a substantially rectangular conductive layer that is provided on the principal surface S1 so as to be in contact with the corner C2 of the principal surface S1, which is a corner opposite to the corner C1. The principal surface electrode 18b is in contact with the side surface electrode 16b at a side thereof on the positive side in the y-axis direction. However, the side of the principal surface electrode 18b on the positive side in the y-axis direction is preferably in contact with only a portion of a long side of the principal surface S1 on the positive side in the y-axis direction. Preferably a gap is provided between a side of the principal surface electrode 18b on the negative side in the y-axis direction and a long side of the principal surface S1 on the negative side in the y-axis direction. Therefore, the principal surface electrode 18b is insulated from the external electrode 14a. However, the side of the principal surface electrode 18b on the negative side in the y-axis direction is preferably located on a more negative side in the y-axis direction than the intersection point P1 between the diagonals of the principal surface S1. In addition, a side of the principal surface electrode 18b on the positive side in the x-axis direction preferably matches a short side of the principal surface S1 on the positive side in the x-axis direction. In addition, a side of the principal surface electrode 18b on the negative side in the x-axis direction preferably extends in the y-axis direction on a more positive side in the x-axis direction than the intersection point P1. Therefore, the side of the principal surface electrode 18a on the positive side in the x-axis direction and the side of the principal surface electrode 18b on the negative side in the x-axis direction extend in the y-axis direction parallel or substantially parallel to each other, and partially overlap when viewed in a plan from the x-axis direction. That is, the principal surface electrodes 18a and 18b face each other in the x-axis direction through a gap.

The principal surface electrode 19b is fabricated by plating a ground electrode made of Ni with Cu, for example. The principal surface electrode 19b is connected to the side surface electrode 16b and provided on the bottom surface of the one of the insulation layers 20 that is provided on the most negative side in the z-axis direction. More specifically, the principal surface electrode 19b is preferably a substantially rectangular conductive layer that is provided on the principal surface S2 so as to be in contact with the corner C6 of the principal surface S2, which is a corner opposite to the corner C5. The principal surface electrode 19b is in contact with the side surface electrode 16b at a side thereof on the positive side in the y-axis direction. However, the side of the principal surface electrode 19b on the positive side in the y-axis direction is preferably in contact with only a portion of a long side of the principal surface S2 on the positive side in the y-axis direction. Preferably, a gap is provided between a side of the principal surface electrode 19b on the negative side in the y-axis direction and a long side of the principal surface S2 on the negative side in the y-axis direction. Therefore, the principal surface electrode 19b is insulated from the external electrode 14a. However, the side of the principal surface electrode 19b on the negative side in the y-axis direction is preferably located on a more negative side in the y-axis direction than the intersection point P2 between the diagonals of the principal surface S2. In addition, a side of the principal surface electrode 19b on the positive side in the x-axis direction preferably matches a short side of the principal surface S2 on the positive side in the x-axis direction. In addition, a side of the principal surface electrode 19b on the negative side in the x-axis direction preferably extends in the y-axis direction on a more positive side in the x-axis direction than the intersection point P2. Therefore, the side of the principal surface electrode 19a on the positive side in the x-axis direction and the side of the principal surface electrode 19b on the negative side in the x-axis direction extend in the y-axis direction parallel or substantially parallel to each other, and partially overlap when viewed in a plan from the x-axis direction. That is, the principal surface electrodes 19a and 19b face each other in the x-axis direction through a gap.

The thickness of the Cu plates to be formed on the external electrodes 14a and 14b configured as described above is preferably between about 2 μm and about 20 μm, for example, and more preferably between about 5 μm and about 15 μm, for example, in order to improve the laser resistance and to reduce the height, which will be described later. In addition, the surface roughness (Ra) of the external electrodes 14a and 14b is preferably about 1.55 μm or less, for example. The surface roughness (Ra) is an arithmetic mean roughness Ra defined in JIS B0601-1994.

Figure 3:
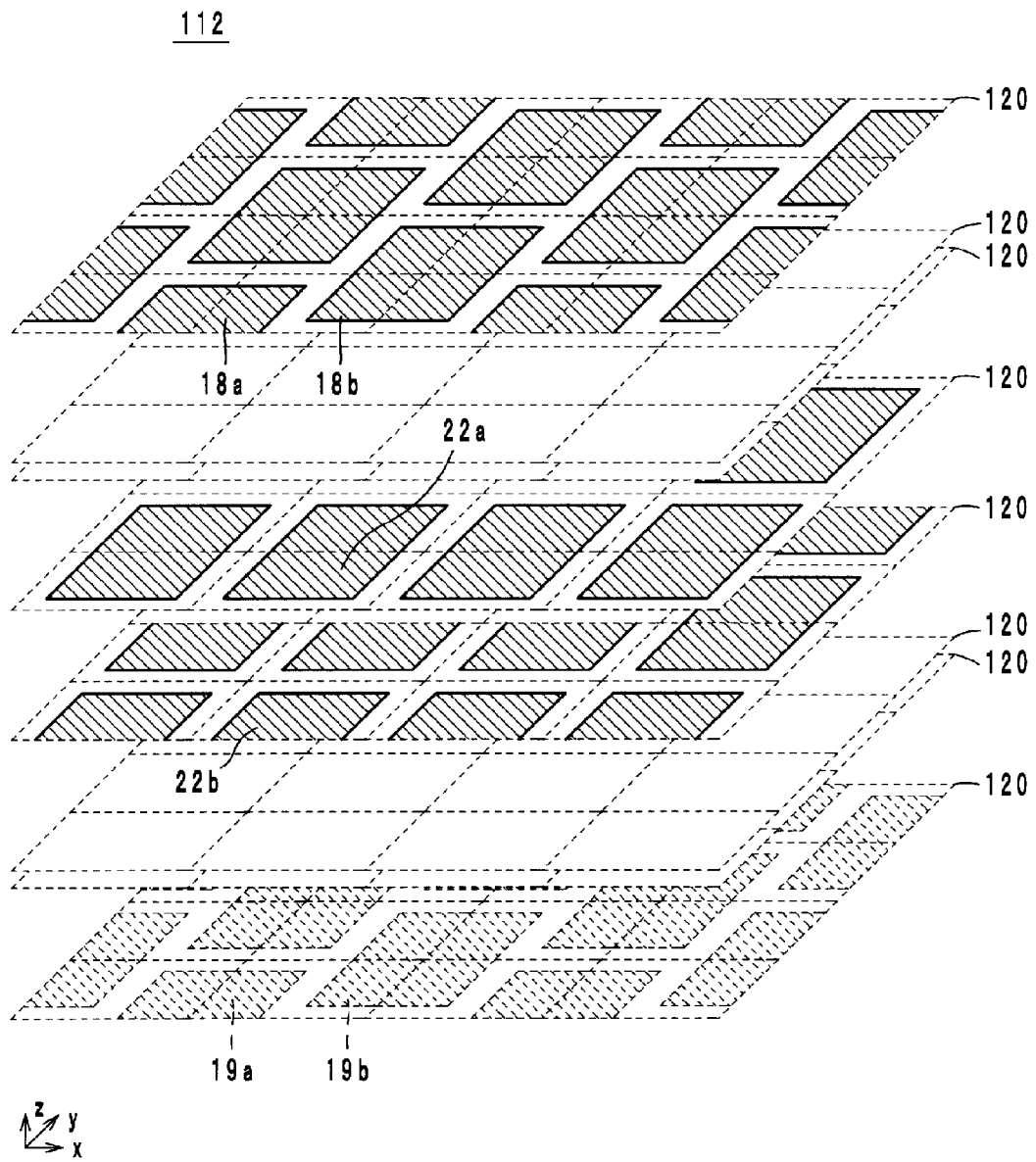
FIG. 3 is an exploded perspective view of a mother multilayer body for the electronic component.

Next, a method for fabricating the electronic component 10a will be described. FIG. 3 is an exploded perspective view of a mother multilayer body 112 of the electronic component 10a.

First, $BaTiO_3$, $CaTiO_3$, $SrTiO_3$, or $CaZrO_3$, for example, which is preferably a principal component, and a Mn compound, a Fe compound, a Cr compound, a Co compound, or a Ni compound, for example, which is preferably an accessory component, are weighed so as to be fed into a ball mill at a certain ratio, and wet mixing is performed. An obtained mixture is dried and ground, and then the obtained powder is calcined. After being levigated using the ball mill, the calcined powder that has been obtained is dried and crushed in order to obtain dielectric ceramic powder.

A binding agent, a plasticizer, a wetting agent, and a dispersing agent are added to the dielectric ceramic powder and mixed in the ball mill. After that, deaeration is performed through decompression. Obtained ceramic slurry is formed on carrier sheets in the shape of sheets preferably using a doctor blade method and dried, in order to fabricate ceramic green sheets 120 illustrated in FIG. 3.

Next, a paste composed of a conductive material is applied to the ceramic green sheets 120 using, for example, a screen printing method in order to form capacitor conductors 22a and 22b, thereby preparing ceramic green sheets 120 on which the capacitor conductors 22a and 22b are formed. The paste composed of a conductive material may preferably be a paste obtained by, for example, adding a varnish and a solvent to Ni, for example.

In addition, by applying a paste composed of a conductive material to the ceramic green sheets 120 using a method such as a screen printing method, principal surface electrodes 18a and 18b or principal surface electrodes 19a and 19b are formed, thereby preparing ceramic green sheets 120 on which the principal surface electrodes 18a and 18b or the principal surface electrodes 19a and 19b are formed. The paste composed of a conductive material may preferably be a paste obtained by, for example, adding a varnish and a solvent to Ni, for example.

Next, the ceramic green sheets 120 are stacked one by one and temporarily pressure-contacted in order to obtain an unfired mother multilayer body 112. When the ceramic green sheets 120 are stacked on one another, the ceramic green sheets 120 on which the capacitor conductors 22a and 22b are formed are stacked in the inner layer region and a plurality of ceramic green sheets 120 that are not provided with the capacitor conductors 22 are stacked in the outer layer regions. Furthermore, the ceramic green sheets 120, each of which is provided with the principal surface electrodes 18a and 18b or the principal surface electrodes 19a and 19b, are stacked as the outermost layers of the multilayer body such that the principal surface electrodes 18a, 18b, 19a, and 19b face outward, thereby obtaining the mother multilayer body 112.

After that, the unfired mother multilayer body 112 is subjected to main press-contacting through hydrostatic pressing.

Next, the unfired mother multilayer body 112 is cut into desired dimensions (for example, about 0.6 mm×about 0.3 mm×about 0.3 mm) and a plurality of unfired multilayer bodies 12 are obtained accordingly.

Next, Ni electrodes that are to function as the insulation layers 16 are preferably formed on the side surfaces S5 and S6 of each of the plurality of unfired multilayer bodies 12. At this time, Ni paste is also preferably slightly applied to the principal surfaces S1 and S2 and the end surfaces S3 and S4, which are adjacent to the side surfaces S5 and S6, because of surface tension (refer to the enlarged view of FIG. 1).

After that, the plurality of unfired multilayer bodies 12 are fired. The firing temperature is preferably, for example, in the range of about 900° C. to about 1300° C. With the above-described steps, preparation of the fired multilayer bodies 12 that include the capacitor conductors 22 is completed.

Next, Ni electrodes that are to function as the side surface electrodes 16 and the principal surface electrodes 18 and 19 are preferably plated with Cu, for example, using a plating method in order to form the side surface electrodes 16 and the principal surface electrodes 18 and 19. Thus, the external electrodes 14 are formed. By the above-described steps, the electronic component 10a is completed.

Figure 4A:
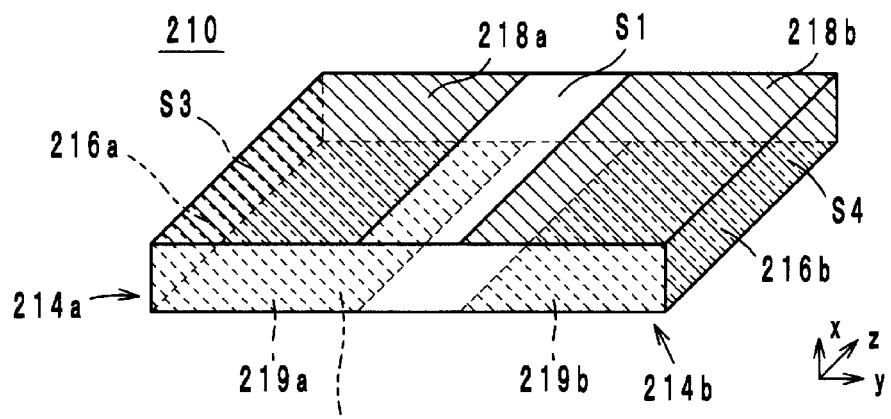
FIGS. 4A and 4B are external perspective views of electronic components in the related art.
Figure 5:
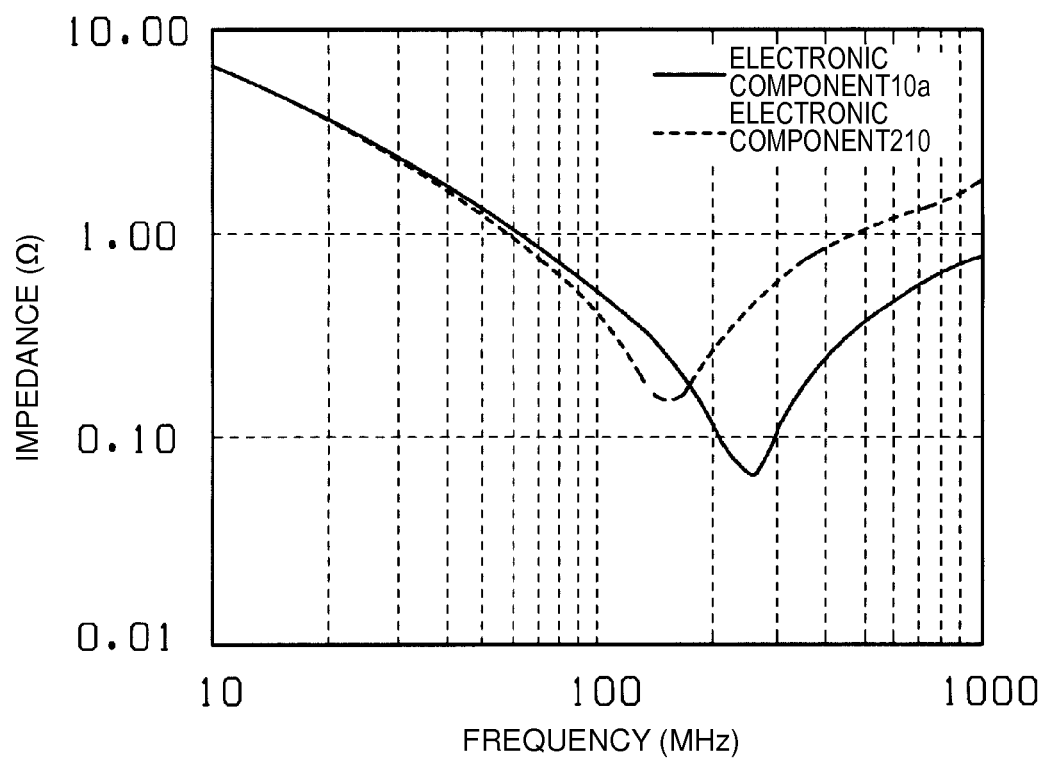
FIG. 5 illustrates results of an analysis using computer simulation.

In the electronic component 10a according to the preferred embodiment described above, ESL is low. FIG. 4A is an external perspective view of an electronic component 210 in the related art. FIG. 5 is a graph illustrating the relationships between the frequencies and the impedances of the electronic component 10a and the electronic component 210. FIG. 5 illustrates the results of an analysis using computer simulation.

The electronic component 210 illustrated in FIG. 4A includes external electrodes 214a and 214b. The external electrodes 214a and 214b include end surface electrodes 216a and 216b, respectively, and principal surface electrodes 218a and 219a and principal surface electrodes 218b and 219b, respectively. The end surface electrodes 216a and 216b are provided on the end surfaces S3 and S4, respectively. The principal surface electrodes 218a and 218b and the principal surface electrodes 219a and 219b are provided on the principal surfaces S1 and S2, respectively. Therefore, in the electronic component 210, a signal path connects the end surface electrodes 216a and 216b. That is, signals are transmitted in the long side direction (x-axis direction) of the principal surface S1.

On the other hand, in the electronic component 10a, the side surface electrodes 16a and 16b are provided on the side surfaces S5 and S6, respectively. Therefore, in the case of the external electrodes 14a, a signal path connects the side surface electrodes 16a and 16b. That is, signals are transmitted in the short side direction (y-axis direction) of the principal surface S1. Therefore, in the electronic component 10a, the signal path is shorter and wider than in the electronic component 210. As a result, in the electronic component 10a, the ESL is advantageously lower than in the electronic component 210.

As illustrated in FIG. 5, in the computer simulation, it can be seen that the ESL is lower in the electronic component 10a than in the electronic component 210. More specifically, the resonant frequency is higher in the electronic component 10a than in the electronic component 210. Therefore, it can be seen that the impedance of the electronic component 10a is lower than that of the electronic component 210 in a frequency band ranging from about 200 MHz to higher frequencies. That is, it can be seen that the ESL is lower in the electronic component 10a than in the electronic component 210. Furthermore, the impedance of the electronic component 10a is lower than that of the electronic component 210 at a resonance point. Therefore, it can be seen that the value of resistance of the electronic component 10a is smaller than that of the electronic component 210. That is, it can be seen that equivalent series resistance (ESR) is also lower in the electronic component 10a than in the electronic component 210.

Figure 4B:
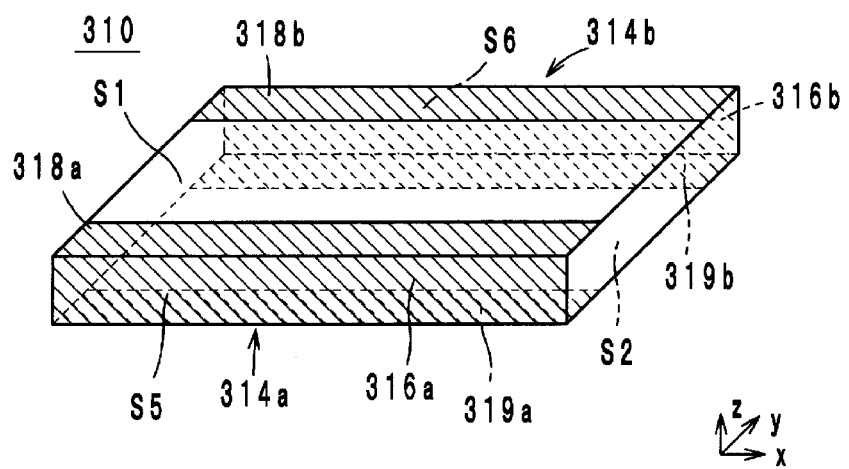
Figure 13A:
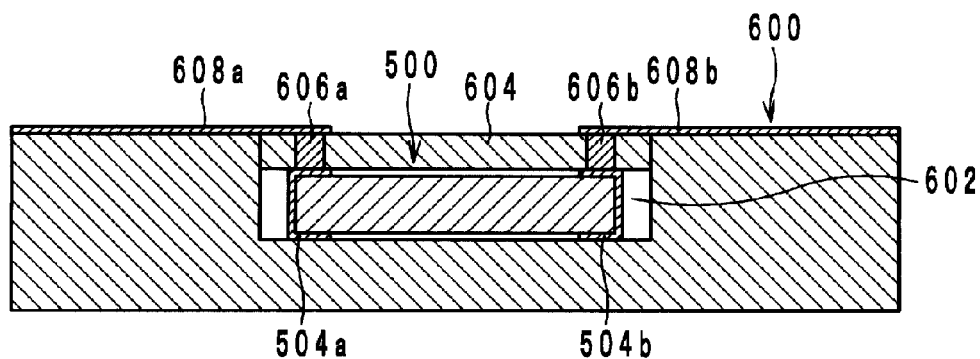
FIG. 13A is a sectional view of a multilayer capacitor disclosed in Japanese Unexamined Patent Application Publication No. 2009-170873 and a circuit board when the multilayer capacitor has been installed in the circuit board.
Figure 13B:
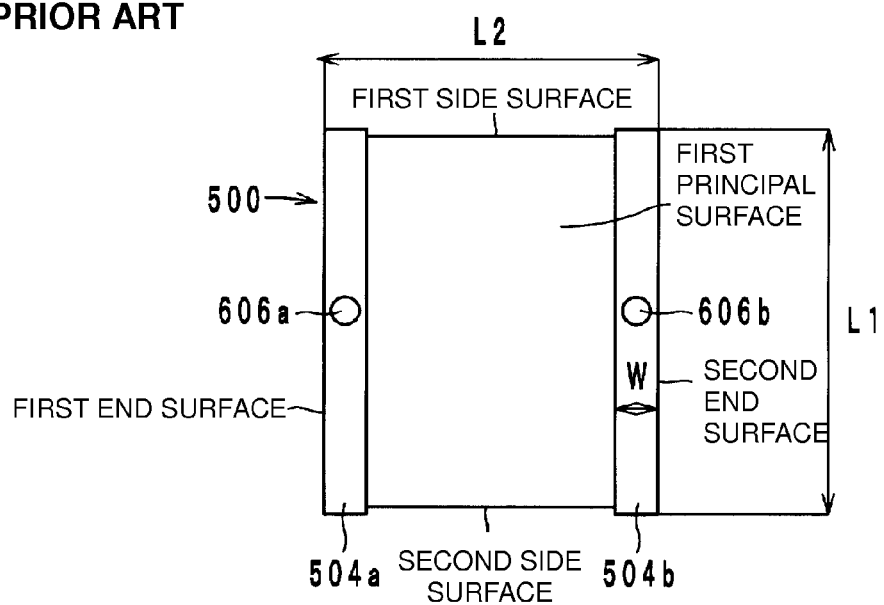
FIG. 13B is a plan view of the multilayer capacitor disclosed in Japanese Unexamined Patent Application Publication No. 2009-170873 and the circuit board when the multilayer capacitor has been installed in the circuit board.

In addition, the electronic component 10a can be easily installed in a circuit board. FIG. 4B is an external perspective view of an electronic component 310 in the related art. The electronic component 310 illustrated in FIG. 4B includes external electrodes 314a and 314b. The external electrodes 314a and 314b include side surface electrodes 316a and 316b, respectively, and principal surface electrodes 318a and 319a and principal surface electrodes 318b and 319b, respectively. The side surface electrodes 316a and 316b are provided on the side surfaces S5 and S6, respectively. The principal surface electrodes 318a and 319a are provided along long sides of the principal surfaces S1 and S2, respectively, on the negative side in the y-axis direction. The principal surface electrodes 318b and 319b are provided along long sides of the principal surfaces S1 and S2, respectively, on the positive side in the y-axis direction. When the electronic component 310 described above is installed in a circuit board, the electronic component 310 is fitted into a recess 602 in a circuit board 600 as illustrated in FIG. 13. The principal surface electrodes 318a and 318b are connected to via-hole conductors 606a and 606b, respectively.

However, in the electronic component 310, since the principal surface electrodes 318a and 318b are provided along the entire long sides of the principal surface S1, the widths of the principal surface electrodes 318a and 318b in the y-axis direction cannot be more than half the width of the principal surface S1 in the y-axis direction. Therefore, in the electronic component 310, it is difficult to form the via-hole conductors 606a and 606b so as to connect to the principal surface electrodes 318a and 318b, respectively.

On the other hand, in the electronic component 10a, the principal surface electrodes 18a and 18b are substantially rectangular conductive layers provided on the principal surface S1 so as to be in contact with the corners C1 and C2, respectively, of the principal surface S1. Therefore, the principal surface electrodes 18a and 18b face each other in the x-axis direction through a gap. That is, in the electronic component 10a, a side of the principal surface electrode 18a on the positive side in the y-axis direction is located on a more positive side in the y-axis direction than a side of the principal surface electrode 18b on the negative side in the y-axis direction. Therefore, in the electronic component 10a, the widths of the principal surface electrodes 18a and 18b in the y-axis direction can preferably be more than half the width of the principal surface S1 in the y-axis direction. For this reason, in the electronic component 10a, it is easy, as compared to the electronic component 310, to form the via-hole conductors 606a and 606b so as to be connected to the principal surface electrodes 18a and 18b, respectively. Thus, the ESL of the electronic component 10a is low while the electronic component 10a can be easily installed in the circuit board 600. It is to be noted that the diameter of the via-hole conductors 606a and 606b is preferably about 100 μm, for example.

Figure 6A:
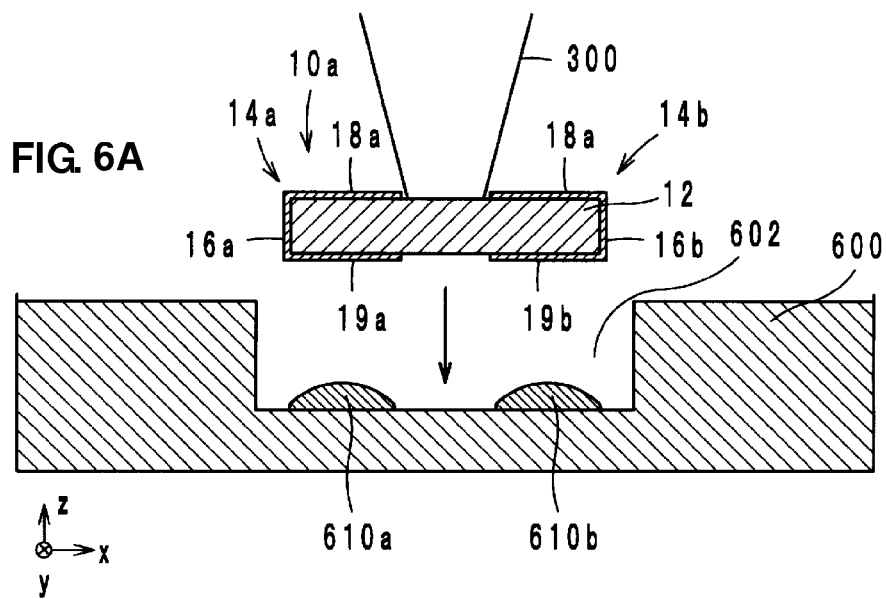
FIGS. 6A and 6B are sectional views of the electronic component during a process for installing the electronic component in a circuit board according to a preferred embodiment of the present invention.
Figure 6B:
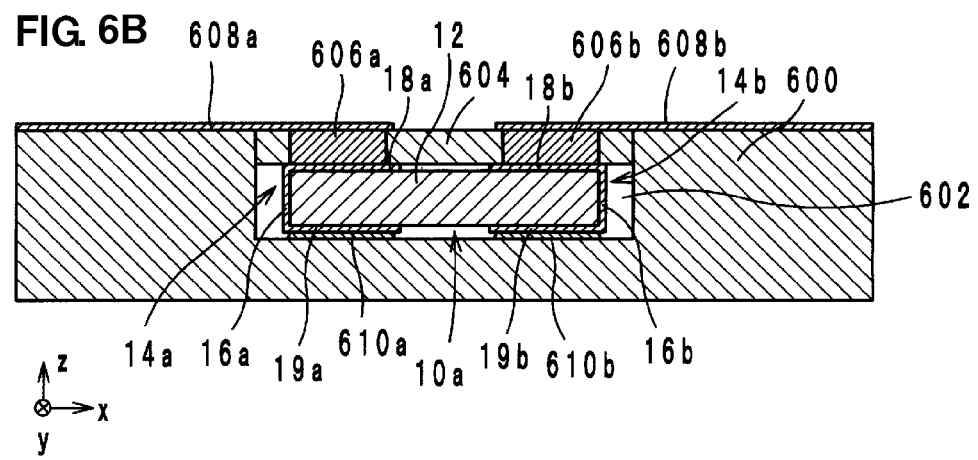

In addition, in the electronic component 10a, breakage of the multilayer body 12 when the multilayer body 12 is installed in the circuit board 600 is effectively prevented. FIGS. 6A and 6B are sectional views of the electronic component 10a and the circuit board 600 during a process of installing the electronic component 10a in the circuit board 600.

When the electronic component 10a is installed in the circuit board 600, the electronic component 10a is fitted into the recess 602 while suction is applied to the principal surface S1 of the multilayer body 12 by a nozzle 300 and the positions of the principal surface electrodes 19a and 19b are aligned with those of adhesives 610a and 610b applied to the recess 602. At this time, the multilayer body 12 receives suction from the nozzle 300 at a central portion of the principal surface S1 toward the negative side in the z-axis direction and a force from the recess 602 at the principal surface electrodes 19a and 19b toward the positive side in the z-axis direction. Therefore, the electronic component 10a may be broken with the long sides thereof bent in substantially V shapes. The electronic component 10a is likely to be broken especially when the height thereof is reduced.

In view of this, in the electronic component 10a, the side surface electrodes 16a and 16b are preferably configured so as to cover the side surfaces S5 and S6, respectively. Therefore, the strength of the multilayer body 12 is improved. As a result, breakage of the electronic component 10a is prevented.

Furthermore, in the electronic component 10a, the side surface electrodes 16a and 16b preferably extend slightly onto the principal surfaces S1 and S2 and the end surfaces S3 and S4, which are adjacent to the side surfaces S5 and S6. Therefore, breakage of the electronic component 10a is more effectively prevented.

The thickness of the Cu plates to be formed on the external electrodes 14a and 14b configured as described above is preferably between about 2 μm and about 20 μm, for example, and more preferably between about 5 μm and about 15 μm, for example, in order to improve the laser resistance and to reduce the height. More specifically, if the thickness of the Cu plates formed on the external electrodes 14a and 14b is less than about 5 μm, the external electrodes 14a and 14 may be damaged when laser beams are radiated during installation of the electronic component 10a. On the other hand, if the thickness of the Cu plates formed on the external electrodes 14a and 14b is greater than about 15 μm, the cost to form the external electrodes 14a and 14b is high and the height cannot be reduced.

By setting the surface roughness (Ra) of the external electrodes 14a and 14b to preferably be about 1.55 μm or less, for example, diffused reflection of laser beams is effectively prevented and minimized when laser beams are radiated during installation of the electronic component 10a.

First Modification

Figure 7:
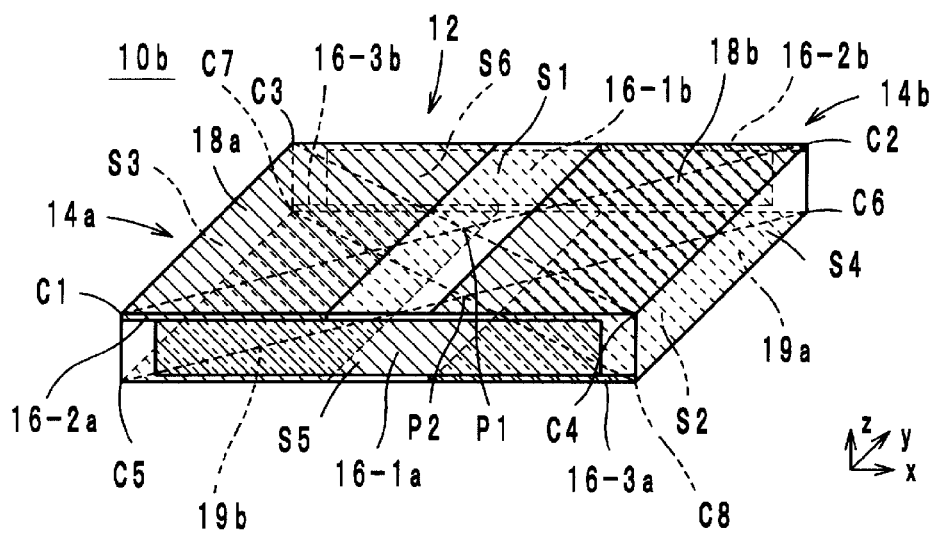
FIG. 7 is an external perspective view of an electronic component according to a first modification of a preferred embodiment of the present invention.
Figure 8:
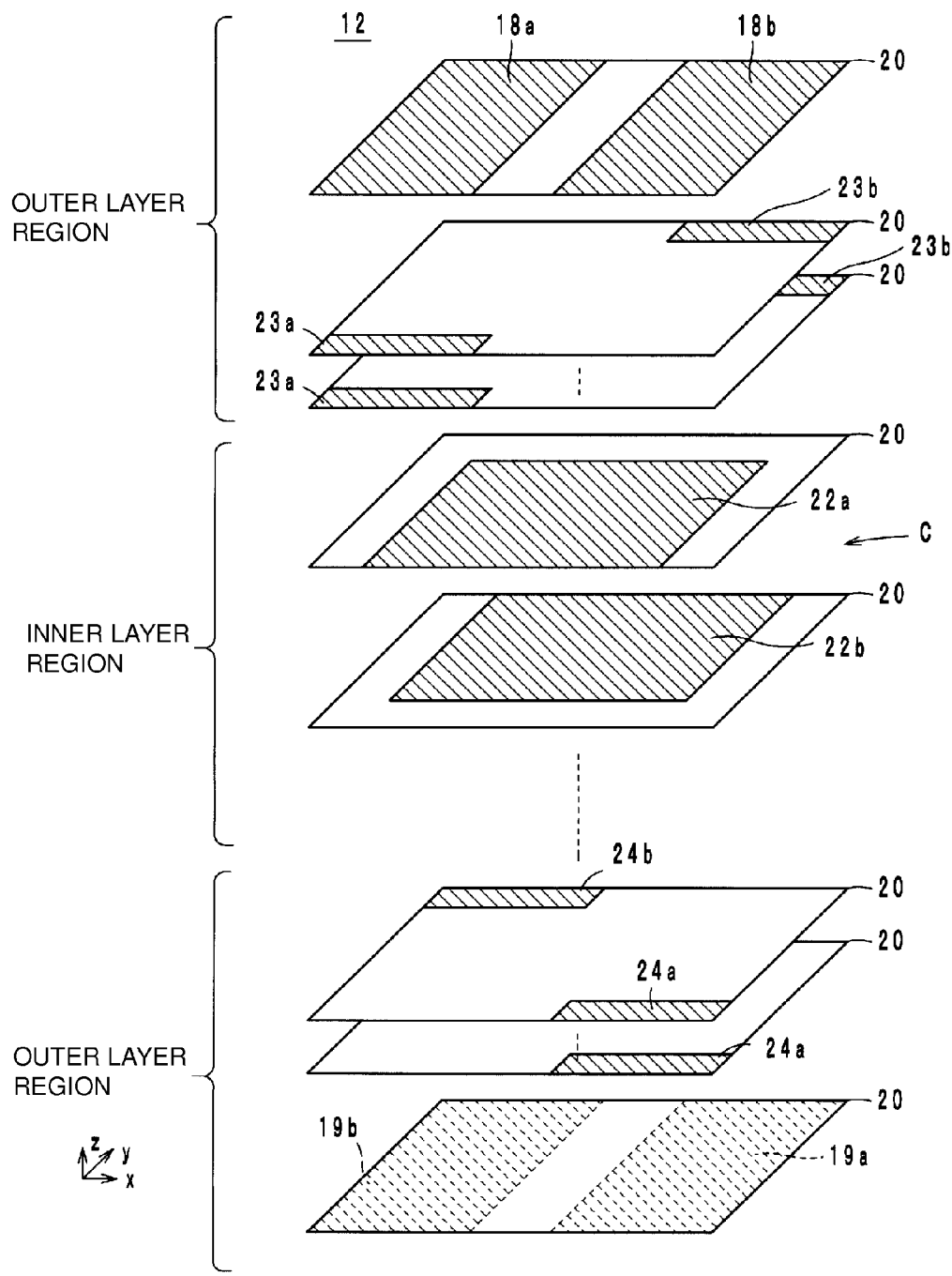
FIG. 8 is an exploded perspective view of a multilayer body of the electronic component illustrated in FIG. 7.

An electronic component 10b according to a first modification of a preferred embodiment of the present invention will be described hereinafter with reference to the drawings. FIG. 7 is an external perspective view of the electronic component 10b according to the first modification. FIG. 8 is an exploded perspective view of a multilayer body 12 of the electronic component 10b illustrated in FIG. 7.

The differences between the circuit board 10a according to the first preferred embodiment and the electronic component 10b according to the first modification are the shapes of the external electrodes 14 and the capacitor conductors 22.

A capacitor conductor 22a preferably has, as illustrated in FIG. 8, a substantially rectangular shape and extends to a side of one of insulation layers 20 on the negative side in the x-axis direction. A capacitor conductor 22b preferably has a substantially rectangular shape and extends to a side of another of the insulation layers 20 on the positive side in the x-axis direction.

External electrodes 14 (14a and 14b) preferably further include, as illustrated in FIG. 7, end surface electrodes 30 (30a and 30b). The end surface electrode 30a is provided on an end surface S3 of the multilayer body 12. The end surface electrode 30a is connected to principal surface electrodes 18a and 19a and a side surface electrode 16a, and covers a portion of the end surface S3 in which the capacitor conductor 22a is exposed. However, the end surface electrode 30a is not in contact with a short side of the end surface S3 on the positive side in the y-axis direction so as not to be in contact with a side surface electrode 16b.

The end surface electrode 30b is provided on an end surface S4 of the multilayer body 12. The end surface electrode 30b is connected to principal surface electrodes 18b and 19b and the side surface electrode 16b, and covers a portion of the end surface S4 in which the capacitor conductor 22b is exposed. However, the end surface electrode 30b is not in contact with a short side of the end surface S4 on the negative side in the y-axis direction so as not to be in contact with the side surface electrode 16a.

In the electronic component 10b configured as described above, the end surface electrodes 30a and 30b are preferably further provided on the end surfaces S3 and S4, respectively. Therefore, with respect to the external electrodes 14a and 14b, signals are transmitted through the side surface electrodes 16a and 16b and the end surface electrodes 30a and 30b. For this reason, in the electronic component 10b, the signal path is wider than in the electronic component 10a. As a result, the ESL of the electronic component 10b is lower than that of the electronic component 10a.

Second Modification

Figure 9:
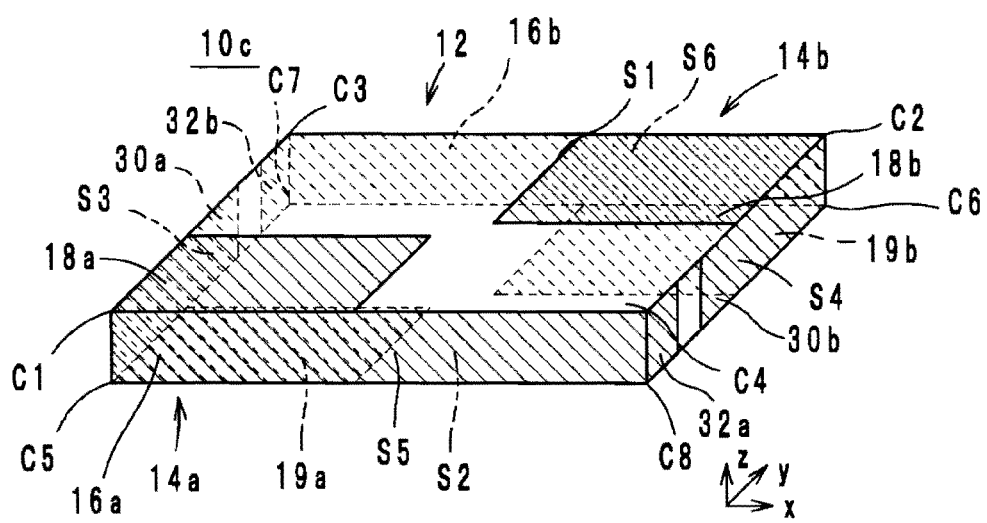
FIG. 9 is an external perspective view of an electronic component according to a second modification of a preferred embodiment of the present invention.
Figure 10:
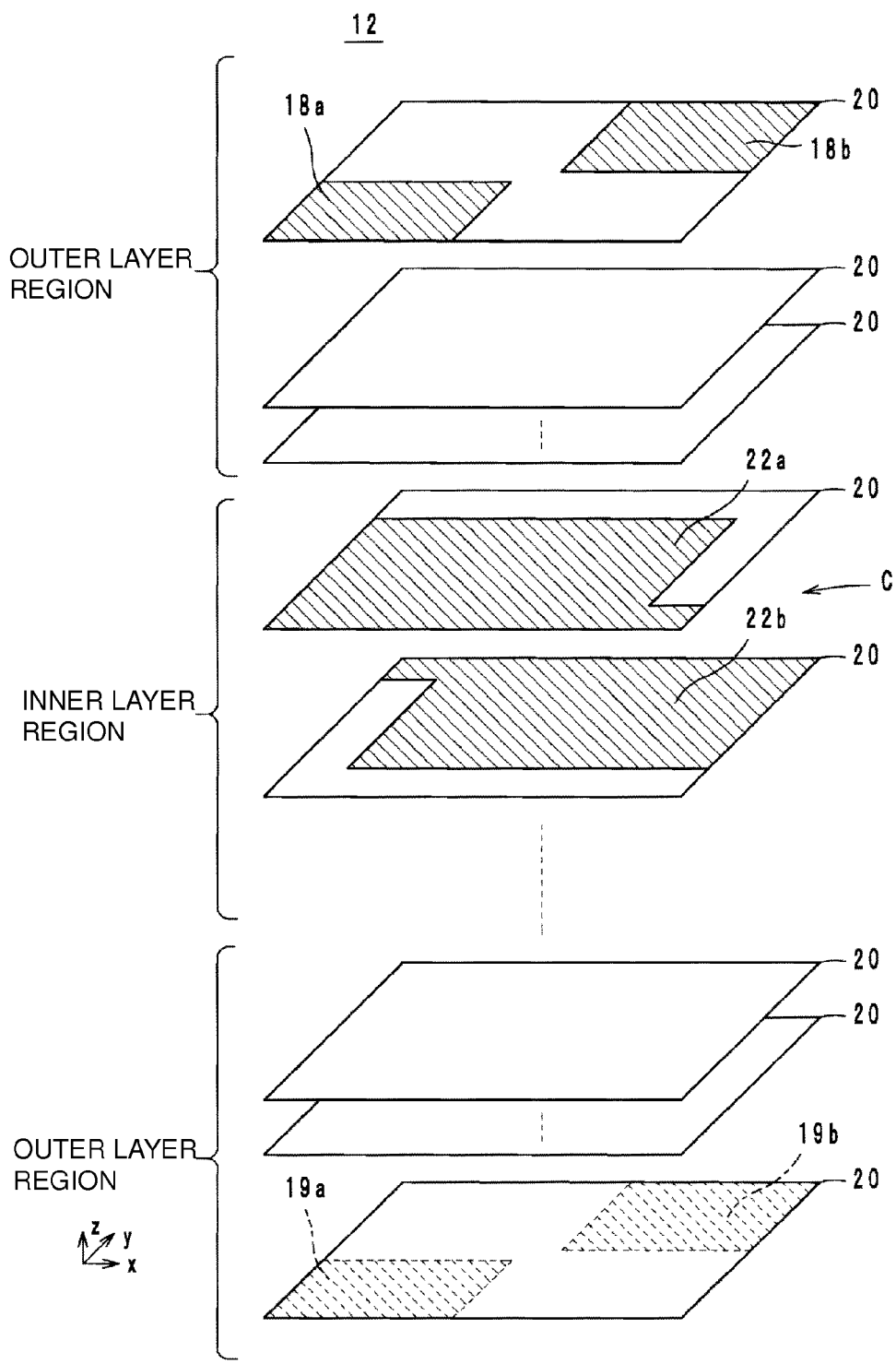
FIG. 10 is an exploded perspective view of a multilayer body of the electronic component illustrated in FIG. 9.

An electronic component 10c according to a second modification of a preferred embodiment of the present invention will be described hereinafter with reference to the drawings. FIG. 9 is an external perspective view of the electronic component 10c according to the second modification. FIG. 10 is an exploded perspective view of a multilayer body 12 of the electronic component 10c illustrated in FIG. 9.

The differences between the electronic component 10b according to the first modification and the electronic component 10c according to the second modification are the shapes of the external electrodes 14 and the capacitor conductors 22.

A capacitor conductor 22a preferably extends, as illustrated in FIG. 10, to a side of one of insulation layers 20 on the negative side in the x-axis direction and to a short side of the one of the insulation layers 20 on the positive side in the x-axis direction along a long side of the one of the insulation layers 20 on the negative side in the y-axis direction. A capacitor conductor 22b preferably has a substantially rectangular shape, for example. The capacitor conductor 22b preferably extends to a side of another of the insulation layers 20 on the positive side in the x-axis direction and to a short side of the another of the insulation layers 20 on the negative side in the x-axis direction along a long side of the another of the insulation layers 20 on the positive side in the y-axis direction.

External electrodes 14 (14a and 14b) preferably further include, as illustrated in FIG. 9, end surface electrodes 32 (32a and 32b). The end surface electrode 32a is provided on an end surface S4 of the multilayer body 12. The end surface electrode 32a is connected to a side surface electrode 16a, and covers a portion of the end surface S4 in which the capacitor conductor 22a is exposed. However, the end surface electrode 32a is not in contact with an end surface electrode 30b.

The end surface electrode 32b is provided on an end surface S3 of the multilayer body 12. The end surface electrode 32b is connected to a side surface electrode 16b and covers a portion of the end surface S3 in which the capacitor conductor 22b is exposed. However, the end surface electrode 32b is not in contact with an end surface electrode 30a.

In the electronic component 10c configured as described above, the end surface electrodes 32a and 32b are preferably further provided on the end surfaces S4 and S3, respectively. Therefore, with respect to the external electrodes 14a and 14b, signals are transmitted through the side surface electrodes 16a and 16b and the end surface electrodes 30a, 30b, 32a, and 32b. For this reason, in the electronic component 10c, the signal path is even wider than in the electronic component 10b. As a result, the ESL of the electronic component 10c is lower than that of the electronic component 10b.

Second Preferred Embodiment

Figure 11:
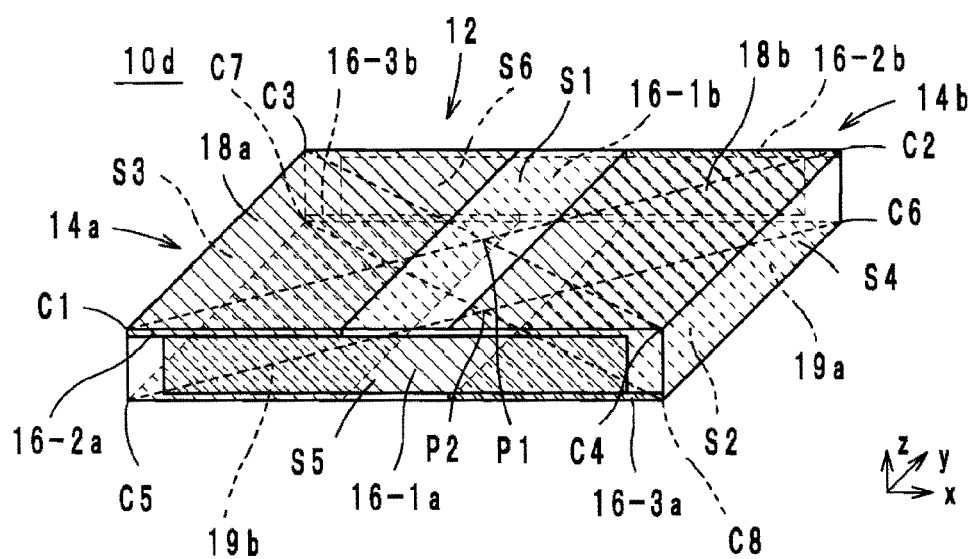
FIG. 11 is an external perspective view of an electronic component according to a second preferred embodiment of the present invention.
Figure 12:
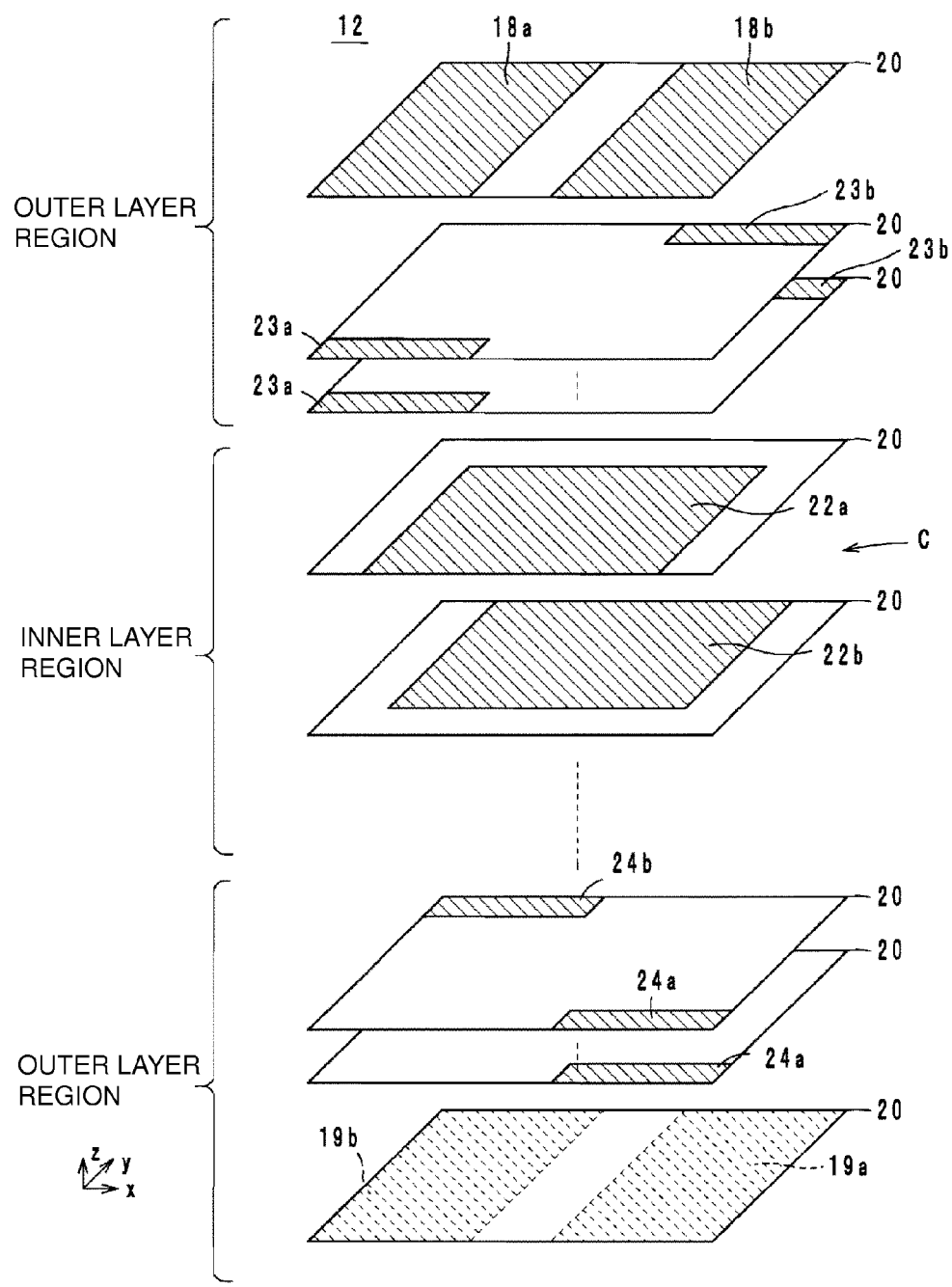
FIG. 12 is an exploded perspective view of a multilayer body of the electronic component illustrated in FIG. 11.

Next, the configuration of an electronic component 10d according to a second preferred embodiment of the present invention will be described with reference to the drawings. FIG. 11 is an external perspective view of the electronic component 10d according to the second preferred embodiment. FIG. 12 is an exploded perspective view of a multilayer body 12 of the electronic component 10d illustrated in FIG. 11.

The electronic component 10d is a chip capacitor and preferably includes, as illustrated in FIGS. 11 and 12, the multilayer body 12, external electrodes 14 (14a and 14b), leading conductors 23 (23a and 23b) and 24 (24a and 24b) (not illustrated in FIG. 11), and a capacitor C (not illustrated in FIG. 11). The chip capacitor preferably has a substantially rectangular parallelepiped shape having dimensions of about 600 μm (x-axis direction)×about 300 μm (y-axis direction)× about 150 μm (z-axis direction), for example. Because the appearance of the multilayer body 12 of the electronic component 10d is substantially the same as that of the multilayer body 12 the electronic component 10a, description thereof is omitted.

The multilayer body 12, as illustrated in FIG. 12, includes a plurality of insulation layers 20 stacked on one another. Because the insulation layers 20 of the electronic component 10d are substantially the same as those of the electronic component 10a, description thereof is omitted.

The capacitor C, as illustrated in FIG. 12, includes capacitor electrodes 22 (22a and 22b) incorporated into the multilayer body 12. Because the capacitor C of the electronic component 10d is substantially the same as that of the electronic component 10a, description thereof is omitted.

The leading conductors 23a and 23b are preferably provided on top surfaces of insulation layers 20 in an outer layer region that is provided on a more positive side in the z-axis direction than an inner layer region. The leading conductors 24 (24a and 24b) are preferably provided on top surfaces of insulation layers 20 in an outer layer region that is provided on a more negative side in the z-axis direction than the inner layer region.

Each of the leading conductors 23a is preferably arranged so as to be in contact with a long side of one of the insulation layers 20 on the negative side in the y-axis direction and to extend from a short side of the one of the insulation layers 20 on the negative side in the x-axis direction. A portion in which each of the leading conductors 23a is in contact with the long side overlaps a portion in which the capacitor conductor 22a is in contact with the long side, when viewed in a plan from the z-axis direction. Each of the leading conductors 23b is preferably arranged so as to be in contact with a long side of one of the insulation layers 20 on the positive side in the y-axis direction and to extend from a short side of the one of the insulation layers 20 on the positive side in the x-axis direction. A portion in which each of the leading conductors 23b is in contact with the long side overlaps a portion in which the capacitor conductor 22b is in contact with the long side, when viewed in a plan from the z-axis direction.

Each of the leading conductors 24a is preferably arranged so as to be in contact with a long side of one of the insulation layers 20 on the negative side in the y-axis direction and to extend from a short side of the one of the insulation layers 20 on the positive side in the x-axis direction. A portion in which each of the leading conductors 24a is in contact with the long side overlaps a portion in which the capacitor conductor 22a is in contact with the long side, when viewed in a plan from the z-axis direction.

Each of the leading conductors 24b is preferably arranged as to be in contact with a long side of one of the insulation layers 20 on the positive side in the y-axis direction and to extend from a short side of the one of the insulation layers 20 on the negative side in the x-axis direction. A portion in which each of the leading conductors 24b is in contact with the long side overlaps a portion in which the capacitor conductor 22b is in contact with the long side, when viewed in a plan from the z-axis direction.

The external electrode 14a preferably includes, as illustrated in FIG. 11, side surface electrodes 16-1a, 16-2a, and 16-3a and principal surface electrodes 18a and 19a. The side surface electrode 16-1a is preferably a substantially rectangular electrode that is arranged so as to cover a portion of a side surface S5, and is connected to the capacitor conductor 22a. The side surface electrode 16-1a is preferably fabricated by plating a portion in which the capacitor conductor 22a is exposed from the side surface S5 with Cu, for example.

The side surface electrode 16-2a is preferably a substantially rectangular electrode that is arranged so as to cover a portion of the side surface S5, and is connected to the side surface electrode 16-1a. The side surface electrode 16-2a is preferably fabricated by plating a portion in which the leading conductor 23a is exposed from the side surface S5 with Cu, for example.

The side surface electrode 16-3a is preferably a substantially rectangular electrode that is arranged so as to cover a portion of the side surface S5, and is connected to the side surface electrode 16-1a. The side surface electrode 16-3a is preferably fabricated by plating a portion in which the leading conductor 24a is exposed from the side surface S5 with Cu, for example.

The principal surface electrode 18a is connected to the side surface electrode 16-2a and provided on a top surface of one of the insulation layers 20 provided on the most positive side in the z-axis direction. More specifically, the principal surface electrode 18a is preferably a substantially rectangular conductive layer that is provided on a principal surface S1 so as to be in contact with a corner C1 of the principal surface S1 and a corner C3, which is adjacent to the corner C1 through a short side. More specifically, the principal surface electrode 18a is in contact with the side surface electrode 16-2a at a side of the surface S1 on the negative side in the y-axis direction. Three sides of the principal surface electrode 18a are preferably in contact with a short side of the principal surface S1 on the negative side in the x-axis direction and two long sides of the principal surface S1, respectively. In addition, a side of the principal surface electrode 18a on the positive side in the x-axis direction preferably extends in the y-axis direction on a more negative side in the x-axis direction than an intersection point P1 between the diagonals of the principal surface S1.

The principal surface electrode 19a is connected to the side surface electrode 16-3a and provided on a bottom surface of one of the insulation layers 20 provided on the most negative side in the z-axis direction. More specifically, the principal surface electrode 19a is preferably a substantially rectangular conductive layer that is provided on a principal surface S2 so as to be in contact with a corner C6 of the principal surface S2 and a corner C8, which is adjacent to the corner C6 through a short side. More specifically, the principal surface electrode 19a is in contact with the side surface electrode 16-3a at a side of the surface S2 on the negative side in the y-axis direction. Three sides of the principal surface electrode 19a are in contact with a short side of the principal surface S2 on the positive side in the x-axis direction and two long sides of the principal surface S2, respectively. In addition, a side of the principal surface electrode 19a on the negative side in the x-axis direction preferably extends in the y-axis direction on a more positive side in the x-axis direction than an intersection point P2 between the diagonals of the principal surface S2.

The external electrode 14b includes, as illustrated in FIG. 11, the side surface electrodes 16-1a, 16-2a, and 16-3a and the principal surface electrodes 18a and 19a. The side surface electrode 16-1b is preferably a substantially rectangular electrode that is arranged so as to cover a portion of a side surface S6, and is connected to the capacitor conductor 22b. The side surface electrode 16-1b is preferably fabricated by plating a portion in which the capacitor conductor 22b is exposed from the side surface S6 with Cu, for example.

The side surface electrode 16-2b is preferably a substantially rectangular electrode that is arranged so as to cover a portion of a side surface S6, and is connected to the side surface electrode 16-1b. The side surface electrode 16-2b is preferably fabricated by plating a portion in which the capacitor conductor 23b is exposed from the side surface S6 with Cu, for example.

The side surface electrode 16-3b is preferably a substantially rectangular electrode that is arranged so as to cover a portion of a side surface S6, and is connected to the side surface electrode 16-1b. The side surface electrode 16-3b is preferably fabricated by plating a portion in which the capacitor conductor 24b is exposed from the side surface S6 with Cu, for example.

The principal surface electrode 18b is connected to the side surface electrode 16-2b and provided on the top surface of the one of the insulation layers 20 provided on the most positive side in the z-axis direction. More specifically, the principal surface electrode 18b is preferably a substantially rectangular conductive layer that is provided on the principal surface S1 so as to be in contact with a corner C2 of the principal surface S1 and a corner C4, which is adjacent to the corner C2 through a short side. More specifically, the principal surface electrode 18b is in contact with the side surface electrode 16-2b at a side of the surface S1 on the positive side in the y-axis direction. Three sides of the principal surface electrode 18b are in contact with a short side of the principal surface S1 on the positive side in the x-axis direction and the two long sides of the principal surface S1, respectively. In addition, a side of the principal surface electrode 18b on the negative side in the x-axis direction preferably extends in the y-axis direction on a more positive side in the x-axis direction than the intersection point P1 between the diagonals of the principal surface S1. Thus, the side of the principal surface electrode 18a on the positive side in the x-axis direction and the side of the principal surface electrode 18b on the negative side in the x-axis direction extend in the y-axis direction parallel or substantially parallel to each other and overlap when viewed in a plan from the x-axis direction. That is, the principal surface electrodes 18a and 18b face each other in the x-axis direction through a gap.

The principal surface electrode 19b is connected to the side surface electrode 16-3a and provided on the bottom surface of the one of the insulation layers 20 provided on the most negative side in the z-axis direction. More specifically, the principal surface electrode 19b is preferably a substantially rectangular conductive layer that is provided on a principal surface S2 so as to be in contact with a corner C5 of the principal surface S2 and a corner C7, which is adjacent to the corner C5 through a short side. More specifically, the principal surface electrode 19b is in contact with the side surface electrode 16-3b at a side of the surface S2 on the positive side in the y-axis direction. Three sides of the principal surface electrode 19b are in contact with a short side of the principal surface S2 on the negative side in the x-axis direction and the two long sides of the principal surface S2, respectively. In addition, a side of the principal surface electrode 19b on the positive side in the x-axis direction preferably extends in the y-axis direction on a more negative side in the x-axis direction than the intersection point P2 between the diagonals of the principal surface S2. Thus, the side of the principal surface electrode 19a on the negative side in the x-axis direction and the side of the principal surface electrode 19b on the positive side in the x-axis direction extend in the y-axis direction parallel to each other and overlap when viewed in a plan from the x-axis direction. That is, the principal surface electrodes 19a and 19b face each other in the x-axis direction through a gap.

As in the electronic component 10d, the side surface electrodes 16-1a to 16-3a and 16-1b to 16-3b need not cover the entire side surfaces S5 and S6, respectively. Furthermore, the side surface electrodes 16-1a to 16-3a and 16-1b to 16-3b are preferably directly formed on the side surfaces S5 and S6, respectively, by plating, for example. Therefore, a dipping process for forming a ground electrode is omitted in a method for fabricating the electronic component 10d, thereby reducing the number of required processes.

In addition, in the electronic component 10d, the widths of the principal surface electrodes 18a and 18b in the y-axis direction are greater than in the electronic component 10a. Therefore, it is easier to install the electronic component 10d in the circuit board 600. Furthermore, in the electronic component 10d, the ESL has a similar value to that produced in the electronic component 10a.

It is to be understood that, in the electronic components 10a to 10d, the external electrodes 14a and 14b may preferably be formed by the following process. That is, a ground electrode is then formed on the multilayer body 12 by a conductive paste including a metal that can be diffused into Cu and a ceramic binding agent, and a first Cu plating film is formed on the ground electrode. Next, the ground electrode and the first Cu plating film are heated in order to diffuse the metal in the ground electrode into the first Cu plating film. Furthermore, a second Cu plating film is formed on the first Cu plating film.

In the external electrodes 14a and 14b fabricated as described above, the second Cu plating films, into which a metal has not been diffused, define surfaces of the external electrodes 14a and 14b. For this reason, the external electrodes 14a and 14b have a high reflectivity against laser beams. Therefore, it is possible to prevent damage to the external electrodes 14a and 14b when laser beams are radiated. However, the second Cu plating films need not be provided in the external electrodes 14a and 14b.

As described above, the present invention is useful for an electronic component and, in particular, advantageous in that the ESL is reduced and installation of the electronic component in a circuit board is facilitated.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a multilayer body having a substantially rectangular parallelepiped shape including a plurality of stacked layers, a first principal surface and a second principal surface located at both ends of the multilayer body in a direction in which plurality of layers are stacked and a first side surface and a second side surface located at both ends of the multilayer body in a short side direction defined as a direction in which shorter sides of the first principal surface extend;
   a first capacitor conductor and a second capacitor conductor defining a portion of a capacitor in the multilayer body;
   a first external electrode including:
      a first side surface electrode connected to the first capacitor conductor and provided on the first side surface; and
      a first principal surface electrode having a substantially rectangular shape and being connected to the first side surface electrode, the first principal surface electrode being provided on the first principal surface so as to be in contact with a first corner of the first principal surface; and
   a second external electrode including:
      a second side surface electrode connected to the second capacitor conductor and provided on the second side surface; and
      a second principal surface electrode having a substantially rectangular shape and being connected to the second side surface electrode, the second principal surface electrode being provided on the first principal surface so as to be in contact with a second corner of the first principal surface opposite to the first corner; wherein
   the second principal surface electrode faces the first principal surface electrode in a longitudinal direction in which longer sides of the first principal surface extend; and
   the first side surface electrode is longer than the first principal surface electrode in the longitudinal direction and the second side surface electrode is longer than the second principal surface electrode in the longitudinal direction.

2. The electronic component according to claim 1, wherein the first side surface electrode covers substantially the entire first side surface.

3. The electronic component according to claim 1, wherein
   the first principal surface electrode is arranged so as to be in contact with a third corner adjacent to the first corner through a short side of the first principal surface; and
   the second principal surface electrode is arranged so as to be in contact with a fourth corner adjacent to the second corner through a short side of the first principal surface.

4. The electronic component according to claim 1, wherein a height of the multilayer body in the direction in which the layers are stacked is in a range of about 50 µm to about 150 µm.

5. The electronic component according to claim 1, wherein the first side surface electrode and the second side surface electrode are plated electrodes.

* * * * *